W. H. CORBOULD.
PROCESS FOR CALCINING ORES.
APPLICATION FILED OCT. 7, 1919.
1,358,293.
Patented Nov. 9, 1920.
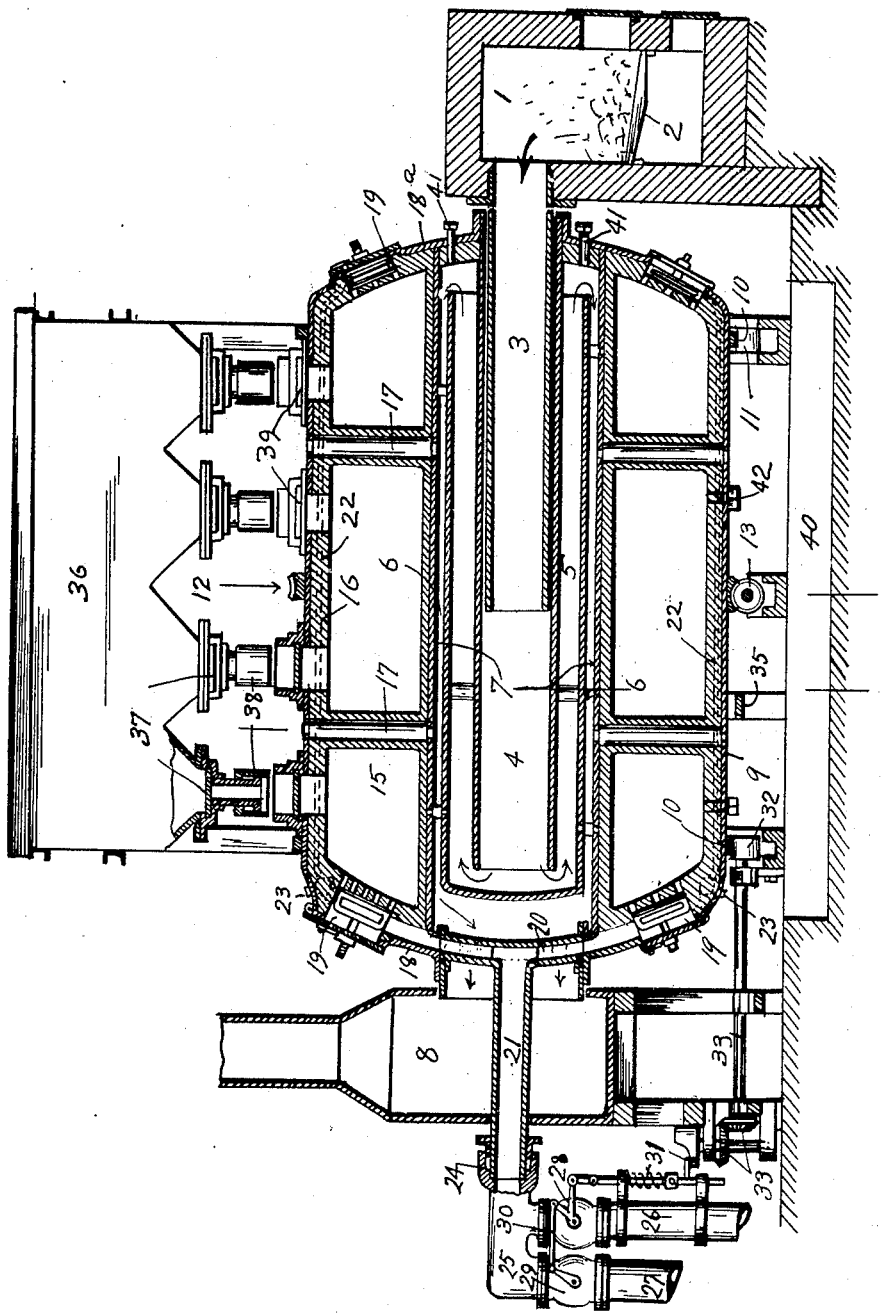
Inventor
W. H. Corbould,
By H. R. Kerslake
Attorney

UNITED STATES PATENT OFFICE.

WILLIAM H. CORBOULD, OF SELWYN, QUEENSLAND, AUSTRALIA.

PROCESS FOR CALCINING ORES.

1,358,293.  Specification of Letters Patent.  Patented Nov. 9, 1920.

Application filed October 7, 1919. Serial No. 329,026.

*To all whom it may concern:*

Be it known that I, WILLIAM HENRY CORBOULD, a subject of Great Britain, residing at Selwyn, in the State of Queensland, Commonwealth of Australia, have invented certain new and useful Improvements in Processes for Calcining Ores, of which the following is a specification.

This invention relates to an improved process for calcining ores and their gangue and more especially to ores of copper and their gangue, and apparatus therefor, and has for its object the providing of process and means whereby greater efficiency and increased economy are obtained than has been the practice heretofore.

I have found that when finely ground ore products, with special reference to ores of copper and their gangue, are subjected to heat and air pressure, the chemical and catalytical actions are perfect and rapid.

In this invention I make use of this discovery by subjecting the contents of the roasting furnace herein described to a plenum of air and to an exhausted atmosphere alternately.

In the accompanying sheet of drawing a longitudinal section is shown of apparatus of novel construction for the carrying out of the invention.

1 is the fire box, and 2 the furnace bars, 3 the brickwork lining of the pipe 4 through which the heated gases of combustion flow from the fire box 1 to the roaster, through the annular chamber 5 and the inclosing annular passage 6. The outer wall 7 of the annular passage 6 constitutes the surface from which the heat is radiated to heat the contents of the roasting furnace. From this chamber 6 the gases flow through a passage—not shown—to the chimney flue or stack 8 and so on to the outer air, or elsewhere when required, to be used for further heating purposes. When the temperature of calcining does not exceed 800 to 900 degrees Fahr. the heat radiating tubes may be constructed of cast iron. But when the required heat exceeds the above mentioned temperatures, it is necessary to use materials of greater heat resisting qualities. In such case a heat-resisting metal alloy is employed, or the tubes are built *in situ* of special dovetailed firebrick, chrome brick, or crushed chrome and silicate of soda mixture suitably reinforced. 9 is the shell of the roasting chamber which is constructed of sufficient strength to withstand the requisite air and gas pressure, 10 the riding rings thereof, supported upon rollers 11. 12 is the driving wheel, 13 the driving worm, and 14 the pulley to which power is applied for operating the worm and wheel. The shell 9 and the dished ends of the roasting chamber 15 are suitably covered internally with a lagging 16 composed either of slag, reinforced sand and cement mixture, firebrick, chrome or magnesite brick, or a mixture of pulverized chrome and silicate of soda, and the heat radiating tube 7, and its stays 17 are similarly lagged. These stays 17 are secured each at one end to the shell plate 9 of the roasting furnace, and each at the other end, to the shell plate 7 of the heat radiator.

In the dished ends 18 and 18ª are formed and positioned a plurality of filter boxes 19 through which compressed air—heated or otherwise—is periodically forced into the roasting chamber to form a plenum, and, through which are periodically withdrawn air and gases from the roasting chamber, to form a partial vacuum therein.

These filter boxes 19 are designed to effect an even distribution of the entering compressed air, and, further to prevent the carrying over of solid impurities by the exhausting air or gases. Depending upon the class of ores undergoing treatment these objects are obtained by the use of such filtering media as asbestos cloth, special metal filter cloth, or porous refractory material through which the air and vapors are caused to pass.

Compressed air is supplied from an air compressor and the gases withdrawn—by the action of the air exhauster or fan—from the roasting furnace through the filter boxes 19, positioned on the dished end 18 of the furnace through the passages 20 and pipe 21 and connections are established between such supply pipes by the pipes 22 shown in dotted lines embedded in the lagging 16 of the roasting furnace. 23 are their controlling check valves.

The pipe 21 is formed axially on the dished end 18 of the roasting furnace and the pipes or passages 20 are led into it. The free end of this pipe 21 is housed within a gland and stuffing box 24 to obviate air and gas leakage and at the same time to permit of free rotation therein. From the stuffing box 24 is led a pipe 25 carrying two branches, one, 26, being carried to an air exhauster—such as a centrifugal fan, or such like mechanism,—not shown in the drawing—and the other branch 27, to an air compressor—not shown in the drawings.

Upon each of these branches is positioned a valve 28 and 29 respectively, the operative levers of which are mechanically coupled together by the rod 30 which causes them to move in unison. These valves mechanically coupled together as described are jointly operated by Corliss valve gear mechanism 31.

This gear 31 is actuated, either by an independent motor, or such like contrivance, or by mechanism operated by the rotation of the roasting furnace, as shown in the drawings. In this latter case the pulleys 32 in frictional contact with one of the rotating riding rings 10 actuates the shaft 33, and through it the bevel wheels 34 and the gear 31.

Safety valves—not shown—are positioned at various points on a line on the circumference of the barrel of the furnace and are operable when riding free of the guard 35 but closed and inoperable when in contact with such guard to obviate leakage of the contained ores when the valves are inverted. 36 are the ore bins. 37 are the charging gates, 38 sliding collars thereon to connect the discharge end of the latter with the roasting furnace charging gates 39. 40 is the pit into which the calcined ores from the furnace are discharged through the gates 39 when such are inverted over the pit 40 to discharge, and from which they are removed by a conveyer or such like appliance. 41 are piped connections mounted upon the dished end 18 of the roasting furnace to provide means for blowing out the dust, soot, and such like accumulations from the radiator heating tubes. 42 are the pyrometer and testing connections.

In operation finely ground ores, together with their gangue are charged from the bins 36 into the roasting furnace, and when so charged the furnace is revolved at a speed of about one-half to one revolution per minute. In exceptional cases, however, a greater or less speed may be employed.

The heated gases of combustion pass from the fire box 1 through the tube 4 and traverse the passages 5 and 6, provided for them in the heat radiator, finally escaping as described, by means of the passage—not shown—to the chimney flue or stack 8.

The heat required for the carrying out of the roasting operation is obtained by radiation, and owing to the construction and position of the radiator—within the roasting furnace—the heat so supplied is evenly distributed through the contents of the chamber 15 and so insures a uniform roast of the contents.

The air exhauster valve 28 and the air compression valve 29 being coupled to one another are, in consequence, operated simultaneously by the Corliss gear 31, and they are so arranged that by the movement of the gear 31 one valve is fully opened while the other one is fully closed, and vice versa; thus when the air compressor is delivering compressed air to the roaster furnace through the valve 29 the air exhauster or fan is rendered inoperative by the closing of the valve 28 and so when the valve 28 is opened the valve 29 is closed. The speed of rotation of the roaster furnace, or other power drive controlling the Corliss gear 31 regulates the periodicity of these air operations.

This regulation of periodicity is necessary in the treatment of various classes of ore as for instance in the case of a sulfid ore, a gas rich in $SO_2$ may be obtained or a gas lower in $SO_2$ may be drawn off by the simple adjustment of the periodicity of operations of the valves, or, by the regulating of the amount of their opening.

Upon the opening of the valve 29 the compressed air from the compressor passes through the pipes 25 and 21 to the passages 20 from whence a portion of the air finds its way into the roaster furnace chamber 15 through the filtering medium of the filter boxes 19 positioned in the dished end 18 while the remainder flows through the check air non-return valve 23 and their pipes 22 to corresponding filter boxes 19 positioned in the dished end $18^a$, through which it is admitted to the roaster furnace. Thus compressed air is simultaneously admitted through a plurality of points to both ends of the furnace, thereby securing therein an equitable air distribution throughout.

In the reduction of certain classes of ores and their gangues it is found advantageous to introduce chlorin gas under pressure, with or without compressed air. In this case the chlorin gas is introduced into the roasting chamber through the plurality of points as above described and its supply is caused to alternate with a depleted atmosphere as set out.

Upon the closing of the valve 29 and the operating of the valve 28, the air exhaust fan operates to exhaust the air and fumes contained within the roaster furnace to cause a partial vacuum therein.

Thus the action of the air compressor, and air exhauster by the manipulation of the valves 28 and 29, causes a plenum and a partial vacuum to be established alternately within the roasting furnace, and these conditions are maintained for any desirable period during the roasting operations.

Although this invention has been described and illustrated in reference to a rotary furnace, it is obvious that it is equally applicable to stationary furnaces.

I claim:

1. A process of calcining ores of copper and their gangue consisting in subjecting the finely pulverized material to heat in a roasting furnace, while treating such product, alternately to the action of air under a pressure substantially above atmospheric and to a substantial partial vacuum, during such operation.

2. A process for the purposes specified consisting in roasting the finely ground ores of copper and their gangue by the application of heat in a furnace, periodically admitting compressed gas containing an ingredient capable of reacting with the said ore until a pressure substantially above atmospheric is produced, and periodically partially exhausting the contained gas and air from such furnace, to alternately produce a plenum and a partial vacuum therein, during such operation.

3. A process for the purposes specified consisting in roasting the finely ground ores of copper and their gangue by the application of heat in a furnace, periodically admitting compressed air and free oxygen to the said furnace, and periodically partially exhausting the contained gases therefrom to alternately produce a substantial plenum and a substantial partial vacuum therein during such process.

4. In a process for the purposes specified and as set out in claim 1, the application of air and chlorin gas under pressure to the material undergoing treatment in the roasting chamber, and the withdrawal of the products of combustion therefrom, for the purpose of alternately creating a substantial superatmospheric and substantial subatmospheric pressure, within the said chamber during the roasting operation.

In testimony whereof I affix my signature in the presence of two witnesses.

W. H. CORBOULD.

Witnesses:
H. N. YOUNG,
E. M. CUTCHISON.